(12) United States Patent
Smith et al.

(10) Patent No.: US 10,537,764 B2
(45) Date of Patent: Jan. 21, 2020

(54) EMERGENCY STOP WITH MAGNETIC BRAKE FOR AN EXERCISE DEVICE

(71) Applicant: ICON Health & Fitness, Inc., Logan, UT (US)

(72) Inventors: Kent M. Smith, Nibley, UT (US); David Hays, Hyde Park, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 507 days.

(21) Appl. No.: 15/228,526

(22) Filed: Aug. 4, 2016

(65) Prior Publication Data

US 2017/0036053 A1    Feb. 9, 2017

Related U.S. Application Data

(60) Provisional application No. 62/202,595, filed on Aug. 7, 2015.

(51) Int. Cl.
*A63B 21/015*  (2006.01)
*A63B 21/00*  (2006.01)
(Continued)

(52) U.S. Cl.
CPC ........ *A63B 21/015* (2013.01); *A63B 21/0051* (2013.01); *A63B 21/00069* (2013.01); *A63B 22/0605* (2013.01); *A63B 71/0054* (2013.01); *A63B 21/008* (2013.01); *A63B 21/0085* (2013.01); *A63B 21/0088* (2013.01); *A63B 21/225* (2013.01); *A63B 22/0056* (2013.01); *A63B 22/0664* (2013.01); *A63B 2071/0081* (2013.01); *A63B 2071/065* (2013.01);
(Continued)

(58) Field of Classification Search
CPC ......... A63B 22/06; A63B 21/00; A63B 21/01; A63B 21/00069; A63B 2225/09; A63B 2225/093; A63B 21/02; A63B 2071/0081
See application file for complete search history.

(56) References Cited

U.S. PATENT DOCUMENTS 1,577,866 A    3/1926  Mossberg
2,041,445 A    5/1936  Warren
(Continued)

FOREIGN PATENT DOCUMENTS

CN    201603343    10/2010
CN    202637828    1/2013
(Continued)

OTHER PUBLICATIONS

English Translation of Office Action and Search Report issued in Chinese Patent Application No. 2016106383158 dated Mar. 22, 2018.

*Primary Examiner* — Garrett K Atkinson
(74) *Attorney, Agent, or Firm* — Ray Quinney & Nebeker

(57) ABSTRACT

A control mechanism includes a friction brake assembly. The friction brake assembly includes a push rod and a friction pad connected to the push rod. The control mechanism also includes a magnetic resistance assembly. The magnetic resistance assembly includes a rotatable sleeve, a movable housing in contact with the rotatable sleeve, and at least one magnet disposed within the movable housing. The control mechanism also includes a knob in mechanical communication with both the push rod and the rotatable sleeve.

7 Claims, 6 Drawing Sheets

(51) Int. Cl.

| | | |
|---|---|---|
| *A63B 22/06* | (2006.01) | |
| *A63B 21/005* | (2006.01) | |
| *A63B 71/00* | (2006.01) | |
| *A63B 21/22* | (2006.01) | |
| *A63B 21/008* | (2006.01) | |
| *A63B 22/00* | (2006.01) | |
| *A63B 71/06* | (2006.01) | |
| *B62L 1/00* | (2006.01) | |

(52) U.S. Cl.
CPC ... *A63B 2071/0694* (2013.01); *A63B 2220/00* (2013.01); *A63B 2220/13* (2013.01); *A63B 2220/20* (2013.01); *A63B 2220/34* (2013.01); *A63B 2220/58* (2013.01); *A63B 2225/093* (2013.01); *A63B 2225/68* (2013.01); *A63B 2230/75* (2013.01); *B62L 1/005* (2013.01)

(56) References Cited

U.S. PATENT DOCUMENTS

| | | |
|---|---|---|
| 3,008,265 A | 11/1961 | Converse |
| 3,100,640 A | 8/1963 | Weitzel |
| 3,190,675 A | 6/1965 | Chun-Yi |
| 3,205,888 A | 9/1965 | Stroop |
| 3,227,447 A | 1/1966 | Baker |
| 3,425,523 A | 2/1969 | Robinette |
| 3,432,164 A | 3/1969 | Deeks |
| 3,506,311 A | 4/1970 | Nobach |
| 3,563,541 A | 2/1971 | Sanquist |
| 3,572,700 A | 3/1971 | Mastropaolo |
| 3,621,948 A | 11/1971 | Dimick |
| 3,686,776 A | 8/1972 | Dahl |
| 3,820,617 A | 6/1974 | Groff |
| 3,903,613 A | 9/1975 | Bisberg |
| 3,953,025 A * | 4/1976 | Mazman ............ A63B 21/015 482/118 |
| 3,967,503 A | 7/1976 | Svensson |
| 3,990,136 A | 11/1976 | Hishida |
| 4,007,927 A * | 2/1977 | Proctor ............ A63B 21/015 482/63 |
| 4,045,096 A | 8/1977 | Lidov |
| 4,049,262 A | 9/1977 | Cunningham, Jr. |
| 4,138,286 A | 2/1979 | Chevrolat et al. |
| 4,148,478 A | 4/1979 | Moyski et al. |
| 4,208,921 A | 6/1980 | Keyes |
| 4,278,095 A | 7/1981 | Lapeyre |
| 4,286,696 A | 9/1981 | Szymski et al. |
| 4,290,601 A | 9/1981 | Mittelstadt |
| 4,291,872 A | 9/1981 | Brilando et al. |
| 4,364,557 A * | 12/1982 | Serati ............ A63B 71/06 482/65 |
| 4,408,613 A * | 10/1983 | Relyea ............ A61B 5/222 482/5 |
| 4,417,724 A * | 11/1983 | Bikker ............ A63B 21/015 188/251 A |
| 4,505,473 A | 3/1985 | Pro |
| 4,512,567 A | 4/1985 | Phillips |
| 4,533,136 A | 8/1985 | Smith et al. |
| 4,588,232 A | 5/1986 | Kim et al. |
| 4,589,656 A | 5/1986 | Baldwin |
| 4,595,198 A * | 6/1986 | Sparks ............ A63B 21/015 188/184 |
| 4,602,781 A | 7/1986 | La Marsh et al. |
| 4,611,807 A | 9/1986 | Castillo |
| 4,630,817 A | 12/1986 | Buckley |
| 4,637,605 A | 1/1987 | Ritchie |
| 4,645,199 A | 2/1987 | Bloemendaal |
| 4,673,177 A * | 6/1987 | Szymski ............ A63B 21/015 482/119 |
| 4,702,475 A | 10/1987 | Elstein et al. |
| 4,709,917 A | 12/1987 | Yang |
| 4,711,447 A | 12/1987 | Mansfield |
| 4,720,099 A | 1/1988 | Carlson |
| 4,720,789 A | 1/1988 | Hector et al. |
| 4,741,578 A | 5/1988 | Viellard |
| 4,743,009 A | 5/1988 | Beale |
| 4,746,112 A | 5/1988 | Fayal |
| 4,762,317 A | 8/1988 | Camfield et al. |
| 4,786,069 A | 11/1988 | Tang |
| 4,826,150 A | 5/1989 | Minoura |
| 4,867,443 A | 9/1989 | Jensen |
| 4,887,967 A | 12/1989 | Letovsky et al. |
| 4,898,379 A | 2/1990 | Shiba |
| 4,900,017 A | 2/1990 | Bold, Jr. |
| 4,917,376 A | 4/1990 | Lo |
| 4,917,377 A | 4/1990 | Chen |
| 4,925,183 A | 5/1990 | Kim |
| 4,932,651 A | 6/1990 | Defaux |
| 4,938,474 A | 7/1990 | Sweeney et al. |
| 4,938,475 A | 7/1990 | Sargeant |
| 4,958,832 A | 9/1990 | Kim |
| 4,977,794 A | 12/1990 | Metcalf |
| 4,981,294 A | 1/1991 | Dalebout et al. |
| 5,000,440 A | 3/1991 | Lynch |
| 5,016,870 A | 5/1991 | Bulloch et al. |
| 5,031,901 A * | 7/1991 | Saarinen ............ A63B 21/0051 310/191 |
| RE33,662 E | 8/1991 | Blair et al. |
| 5,081,991 A | 1/1992 | Chance |
| 5,104,119 A | 4/1992 | Lynch |
| 5,137,501 A | 8/1992 | Mertesdorf |
| 5,139,255 A | 8/1992 | Sollami |
| 5,161,652 A | 11/1992 | Suzuki |
| 5,162,029 A | 11/1992 | Gerard |
| 5,171,196 A | 12/1992 | Lynch |
| 5,178,589 A | 1/1993 | Wilson |
| 5,234,392 A | 8/1993 | Clark |
| 5,240,417 A | 8/1993 | Smithson et al. |
| 5,242,343 A | 9/1993 | Miller |
| 5,261,864 A | 11/1993 | Fitzpatrick |
| 5,277,678 A | 1/1994 | Friedebach et al. |
| 5,299,993 A | 4/1994 | Habing |
| 5,299,997 A | 4/1994 | Chen |
| RE34,728 E | 9/1994 | Hall-Tipping |
| 5,354,251 A | 10/1994 | Sleamaker |
| 5,358,461 A | 10/1994 | Bailey, Jr. |
| 5,362,069 A | 11/1994 | Hall-Tipping |
| 5,372,564 A | 12/1994 | Spirito |
| 5,374,227 A | 12/1994 | Webb |
| 5,383,715 A | 1/1995 | Homma et al. |
| RE34,959 E | 5/1995 | Potts |
| 5,417,643 A | 5/1995 | Taylor |
| 5,419,619 A | 5/1995 | Lew |
| 5,423,729 A | 6/1995 | Eschenbach |
| 5,431,612 A | 7/1995 | Holden |
| 5,435,798 A | 7/1995 | Habing et al. |
| 5,462,503 A | 10/1995 | Benjamin et al. |
| 5,466,203 A * | 11/1995 | Chen ............ A63B 21/0051 482/57 |
| 5,503,043 A | 4/1996 | Olbrich |
| 5,512,029 A | 4/1996 | Barnard |
| 5,514,053 A | 5/1996 | Hawkins et al. |
| 5,529,554 A | 6/1996 | Eschenbach |
| 5,533,951 A | 7/1996 | Chang |
| 5,542,503 A | 8/1996 | Dunn et al. |
| 5,577,985 A | 11/1996 | Miller |
| 5,580,249 A | 12/1996 | Jacobsen et al. |
| 5,584,700 A | 12/1996 | Feldman et al. |
| 5,584,779 A | 12/1996 | Knecht |
| 5,591,104 A | 1/1997 | Andrus et al. |
| 5,611,756 A | 3/1997 | Miller |
| 5,626,401 A | 5/1997 | Terry, Sr. et al. |
| 5,656,001 A | 8/1997 | Baatz |
| 5,665,031 A | 9/1997 | Hsieh |
| 5,665,032 A | 9/1997 | Chen |
| 5,667,459 A | 9/1997 | Su |
| 5,669,833 A | 9/1997 | Stone |
| 5,690,582 A | 11/1997 | Ulrich et al. |
| 5,692,994 A | 12/1997 | Eschenbach |
| 5,708,355 A | 1/1998 | Schrey |
| 5,709,631 A | 1/1998 | Kleinsasser |
| 5,709,632 A | 1/1998 | Socwell |
| 5,735,773 A | 4/1998 | Vittone |

(56) References Cited

U.S. PATENT DOCUMENTS

| | | |
|---|---|---|
| 5,772,522 A | 6/1998 | Nesbit |
| 5,782,639 A | 7/1998 | Beal |
| 5,785,630 A | 7/1998 | Bobick et al. |
| 5,788,609 A | 8/1998 | Miller |
| 5,795,270 A | 8/1998 | Woods et al. |
| 5,826,898 A | 10/1998 | Fortier et al. |
| 5,833,583 A | 11/1998 | Chuang |
| 5,836,855 A | 11/1998 | Eschenbach |
| 5,839,990 A | 11/1998 | Virkkala |
| 5,848,954 A | 12/1998 | Stearns et al. |
| 5,862,892 A | 1/1999 | Conley |
| 5,868,108 A | 2/1999 | Schmitz et al. |
| 5,878,479 A | 3/1999 | Dickerson et al. |
| 5,884,735 A | 3/1999 | Eckel et al. |
| 5,888,172 A | 3/1999 | Andrus et al. |
| 5,890,995 A | 4/1999 | Bobick et al. |
| 5,895,339 A | 4/1999 | Maresh |
| 5,897,460 A | 4/1999 | McBride et al. |
| 5,913,751 A | 6/1999 | Eschenbach |
| 5,916,064 A | 6/1999 | Eschenbach |
| 5,916,067 A * | 6/1999 | Morasse .............. A63B 69/16 482/61 |
| 5,917,692 A | 6/1999 | Schmitz et al. |
| 5,921,896 A | 7/1999 | Boland |
| 5,938,570 A | 8/1999 | Maresh |
| 5,947,824 A | 9/1999 | Minami et al. |
| 5,957,814 A | 9/1999 | Eschenbach |
| 5,967,944 A | 10/1999 | Vittone et al. |
| 5,984,839 A | 11/1999 | Corkum |
| 5,989,161 A | 11/1999 | Wang et al. |
| 5,989,163 A | 11/1999 | Rodgers, Jr. |
| 5,991,143 A | 11/1999 | Wright et al. |
| 6,003,481 A | 12/1999 | Pischinger et al. |
| 6,014,913 A | 1/2000 | Masahiro |
| 6,017,295 A | 1/2000 | Eschenbach |
| 6,039,676 A | 3/2000 | Clive |
| 6,045,488 A | 4/2000 | Eschenbach |
| 6,053,847 A | 4/2000 | Stearns et al. |
| 6,075,525 A | 6/2000 | Hsieh |
| 6,090,014 A | 7/2000 | Eschenbach |
| 6,126,573 A | 10/2000 | Eschenbach |
| 6,142,870 A | 11/2000 | Wada et al. |
| 6,142,913 A | 11/2000 | Ewert |
| 6,142,915 A | 11/2000 | Eschenbach |
| 6,164,423 A | 12/2000 | Dickerson |
| 6,182,531 B1 | 2/2001 | Gallagher et al. |
| 6,183,397 B1 | 2/2001 | Stearns et al. |
| 6,186,290 B1 | 2/2001 | Carlson |
| 6,210,305 B1 | 4/2001 | Eschenbach |
| 6,224,080 B1 | 5/2001 | Ross |
| 6,234,938 B1 | 5/2001 | Chen |
| 6,244,988 B1 | 6/2001 | Delman |
| 6,254,514 B1 | 7/2001 | Maresh et al. |
| 6,277,056 B1 | 8/2001 | McBride et al. |
| 6,280,362 B1 | 8/2001 | Dalebout et al. |
| 6,312,363 B1 | 11/2001 | Watterson et al. |
| 6,361,476 B1 | 3/2002 | Eschenbach |
| 6,361,477 B1 | 3/2002 | Kolda |
| 6,397,797 B1 | 6/2002 | Kolmanovsky et al. |
| 6,416,442 B1 | 7/2002 | Stearns et al. |
| 6,419,611 B1 | 7/2002 | Levine et al. |
| 6,422,976 B1 | 7/2002 | Eschenbach |
| 6,447,424 B1 | 9/2002 | Ashby et al. |
| 6,450,923 B1 | 9/2002 | Vatti |
| 6,454,679 B1 | 9/2002 | Radow |
| 6,458,060 B1 | 10/2002 | Watterson et al. |
| 6,482,128 B1 | 11/2002 | Michalow |
| 6,482,132 B2 | 11/2002 | Eschenbach |
| 6,491,606 B1 * | 12/2002 | Swift .............. A63B 22/0605 482/57 |
| 6,497,426 B2 | 12/2002 | VanPelt |
| 6,505,503 B1 | 1/2003 | Teresi et al. |
| 6,530,864 B1 | 3/2003 | Parks |
| 6,547,702 B1 | 4/2003 | Heidecke |
| 6,572,511 B1 | 6/2003 | Volpe |
| 6,592,502 B1 | 7/2003 | Phillips |
| 6,604,008 B2 | 8/2003 | Chudley et al. |
| 6,612,969 B2 | 9/2003 | Eschenbach |
| 6,626,802 B1 | 9/2003 | Rodgers, Jr. |
| 6,647,826 B2 | 11/2003 | Okajima et al. |
| 6,648,353 B1 | 11/2003 | Cabal |
| 6,648,800 B2 | 11/2003 | Stearns et al. |
| 6,659,486 B2 * | 12/2003 | Eschenbach .......... B62K 3/002 280/221 |
| 6,681,728 B2 | 1/2004 | Haghgooie |
| 6,689,019 B2 | 2/2004 | Ohrt et al. |
| 6,695,694 B2 | 2/2004 | Ishikawa et al. |
| 6,702,719 B1 | 3/2004 | Brown et al. |
| 6,712,737 B1 | 3/2004 | Nusbaum |
| 6,758,790 B1 | 7/2004 | Ellis |
| 6,786,821 B2 | 9/2004 | Nobe et al. |
| 6,786,848 B2 | 9/2004 | Yamashita et al. |
| 6,786,850 B2 | 9/2004 | Nizamuddin |
| 6,793,609 B1 | 9/2004 | Fan |
| 6,796,927 B2 | 9/2004 | Toyama |
| 6,824,502 B1 | 11/2004 | Huang |
| 6,835,166 B1 | 12/2004 | Stearns et al. |
| 6,837,829 B2 | 1/2005 | Eschenbach |
| 6,840,892 B1 | 1/2005 | Wu |
| 6,887,190 B1 | 5/2005 | Azari |
| 6,902,513 B1 | 6/2005 | McClure |
| 6,902,515 B2 | 6/2005 | Howell et al. |
| 6,908,417 B2 | 6/2005 | Jackson |
| 6,910,991 B2 | 6/2005 | Matsumoto |
| 6,910,992 B2 | 6/2005 | Arguilez |
| 6,918,859 B1 | 7/2005 | Yeh |
| 6,918,860 B1 | 7/2005 | Nusbaum |
| 6,926,645 B1 | 8/2005 | Stearns |
| 6,926,646 B1 | 8/2005 | Nguyen |
| 6,932,745 B1 | 8/2005 | Ellis |
| 6,994,656 B2 | 2/2006 | Liao et al. |
| 7,008,173 B2 | 3/2006 | Gabrys et al. |
| 7,009,613 B2 | 3/2006 | Goden |
| 7,022,047 B2 | 4/2006 | Cohen et al. |
| 7,022,048 B1 | 4/2006 | Fernandez |
| 7,033,269 B2 | 4/2006 | Namba et al. |
| 7,037,241 B2 | 5/2006 | Kuo |
| 7,044,891 B1 | 5/2006 | Rivera |
| 7,060,005 B2 | 6/2006 | Carlsen et al. |
| 7,060,006 B1 | 6/2006 | Watterson et al. |
| 7,083,546 B2 | 8/2006 | Zillig |
| 7,101,330 B2 | 9/2006 | Elbaz et al. |
| 7,141,008 B2 | 11/2006 | Krull et al. |
| 7,166,062 B1 | 1/2007 | Watterson et al. |
| 7,166,064 B2 | 1/2007 | Watterson et al. |
| 7,166,067 B2 | 1/2007 | Talish et al. |
| 7,169,088 B2 | 1/2007 | Rodgers, Jr. |
| 7,169,089 B2 | 1/2007 | Rodgers, Jr. |
| 7,172,531 B2 | 2/2007 | Rodgers, Jr. |
| 7,172,532 B2 * | 2/2007 | Baker .............. A63B 22/0605 403/109.1 |
| 7,201,705 B2 | 4/2007 | Rodgers, Jr. |
| 7,201,707 B1 | 4/2007 | Moon |
| 7,214,168 B2 | 5/2007 | Rodgers |
| 7,244,217 B2 | 7/2007 | Rodgers, Jr. |
| 7,278,955 B2 | 10/2007 | Giannelli et al. |
| 7,292,151 B2 | 11/2007 | Ferguson |
| 7,303,508 B2 | 12/2007 | Toyama et al. |
| 7,303,510 B2 | 12/2007 | Gebhardt |
| 7,314,434 B2 * | 1/2008 | Chen ................ A63B 21/0051 188/164 |
| 7,319,457 B2 | 1/2008 | Lin et al. |
| 7,322,907 B2 | 1/2008 | Bowser |
| 7,335,135 B2 | 2/2008 | Wang |
| 7,341,542 B2 | 3/2008 | Ohrt et al. |
| 7,347,806 B2 | 3/2008 | Nakano et al. |
| 7,352,365 B2 | 4/2008 | Trachte |
| 7,364,533 B2 * | 4/2008 | Baker .............. A63B 22/0605 248/408 |
| 7,369,121 B2 | 5/2008 | Lane |
| 7,374,522 B2 | 5/2008 | Arnold |
| 7,375,450 B2 | 5/2008 | Tanaka et al. |
| 7,393,308 B1 | 7/2008 | Huang |
| 7,402,145 B1 | 7/2008 | Woggon |

(56) References Cited

U.S. PATENT DOCUMENTS

| | | |
|---|---|---|
| 7,410,449 B2 | 8/2008 | Yeh |
| 7,422,548 B1 | 9/2008 | Teng |
| 7,462,134 B2 | 12/2008 | Lull et al. |
| 7,470,220 B2 * | 12/2008 | Hernandez ........... A63B 21/012 188/25 |
| 7,491,154 B2 | 2/2009 | Yonehana et al. |
| 7,530,932 B2 | 5/2009 | Lofgren et al. |
| 7,549,947 B2 | 6/2009 | Hickman et al. |
| D596,680 S | 7/2009 | Keiser |
| 7,572,205 B1 | 8/2009 | Cribar |
| 7,575,537 B2 | 8/2009 | Ellis |
| 7,594,878 B1 | 9/2009 | Joannou |
| 7,594,879 B2 | 9/2009 | Johnson |
| 7,645,215 B2 | 1/2010 | Gordon |
| 7,648,446 B2 | 1/2010 | Chiles et al. |
| 7,682,287 B1 | 3/2010 | Hsieh |
| 7,695,406 B2 | 4/2010 | Waters |
| 7,704,192 B2 | 4/2010 | Dyer et al. |
| 7,708,670 B2 | 5/2010 | Bowser |
| 7,731,635 B2 | 6/2010 | Dyer |
| 7,749,137 B2 | 7/2010 | Watt et al. |
| 7,753,824 B2 | 7/2010 | Wang |
| 7,758,469 B2 | 7/2010 | Dyer et al. |
| 7,766,797 B2 | 8/2010 | Dalebout |
| 7,771,325 B2 | 8/2010 | Baker |
| 7,780,577 B2 | 8/2010 | Arnold |
| 7,803,096 B2 | 9/2010 | Mehta |
| 7,825,319 B2 | 11/2010 | Turner |
| 7,837,595 B2 | 11/2010 | Rice |
| 7,841,964 B2 | 11/2010 | Radow |
| 7,850,537 B2 | 12/2010 | Stern |
| 7,862,476 B2 | 1/2011 | Radow |
| 7,862,483 B2 | 1/2011 | Hendrickson et al. |
| 7,867,146 B2 | 1/2011 | Ge et al. |
| 7,871,355 B2 | 1/2011 | Yeh |
| 7,887,465 B2 | 2/2011 | Uffelman |
| 7,901,334 B2 | 3/2011 | Chen et al. |
| 7,918,768 B2 | 4/2011 | Rogozinski |
| 7,935,027 B2 | 5/2011 | Graber |
| 7,963,889 B2 | 6/2011 | Badarneh et al. |
| 7,967,709 B2 | 6/2011 | Emura |
| 8,001,472 B2 | 8/2011 | Gilley et al. |
| 8,002,684 B2 | 8/2011 | Laurent |
| 8,007,422 B2 | 8/2011 | Zaccherini |
| 8,012,003 B2 | 9/2011 | Sterchi et al. |
| 8,012,067 B2 | 9/2011 | Joannou |
| 8,029,415 B2 | 10/2011 | Ashby et al. |
| 8,047,965 B2 | 11/2011 | Shea |
| 8,057,366 B2 | 11/2011 | Schippers |
| 8,062,190 B2 | 11/2011 | Pyles et al. |
| 8,063,776 B2 | 11/2011 | Ruha |
| 8,103,517 B2 | 1/2012 | Hinnebusch |
| 8,105,213 B2 | 1/2012 | Stewart et al. |
| 8,109,858 B2 | 2/2012 | Redmann |
| 8,113,990 B2 | 2/2012 | Kolman et al. |
| 8,123,527 B2 | 2/2012 | Holljes |
| D659,778 S | 5/2012 | Keiser |
| 8,200,323 B2 | 6/2012 | DiBenedetto et al. |
| 8,221,290 B2 | 7/2012 | Vincent et al. |
| 8,235,724 B2 | 8/2012 | Gilley et al. |
| 8,241,182 B2 | 8/2012 | Julskjaer et al. |
| 8,241,186 B2 | 8/2012 | Brodess et al. |
| 8,260,858 B2 | 9/2012 | Belz et al. |
| 8,306,635 B2 | 11/2012 | Pryor |
| 8,360,904 B2 | 1/2013 | Oleson et al. |
| 8,429,223 B2 | 4/2013 | Gilley et al. |
| 8,485,945 B2 | 7/2013 | Leonhard |
| 8,585,561 B2 * | 11/2013 | Watt ................... A63B 21/0051 482/57 |
| 8,647,240 B2 | 2/2014 | Heidecke |
| 8,702,430 B2 | 4/2014 | Dibenedetto et al. |
| 8,734,157 B1 | 5/2014 | Hummel, III |
| 8,738,321 B2 | 5/2014 | Yuen et al. |
| 8,786,575 B2 | 7/2014 | Miller |
| 8,801,578 B2 | 8/2014 | Corbalis et al. |
| 8,834,323 B2 | 9/2014 | Chen |
| 8,834,324 B2 * | 9/2014 | Lull ..................... A63B 21/015 482/63 |
| 8,845,493 B2 | 9/2014 | Watterson et al. |
| 8,876,669 B2 | 11/2014 | Vujicic |
| 8,939,831 B2 | 1/2015 | Dugan |
| 8,950,276 B2 | 2/2015 | Wu |
| 8,956,290 B2 | 2/2015 | Gilley et al. |
| 8,990,732 B2 | 3/2015 | Farrenkopf et al. |
| 8,996,978 B2 | 3/2015 | Richstein et al. |
| 9,011,291 B2 | 4/2015 | Birrell |
| 9,039,581 B2 | 5/2015 | Chia et al. |
| 9,044,635 B2 * | 6/2015 | Lull ..................... A63B 21/015 |
| 9,081,534 B2 | 7/2015 | Yuen et al. |
| 9,084,565 B2 | 7/2015 | Mason et al. |
| 9,088,450 B2 | 7/2015 | Jung et al. |
| 9,108,081 B2 | 8/2015 | Giannelli et al. |
| 9,114,276 B2 | 8/2015 | Bayerlein et al. |
| 9,148,077 B2 | 9/2015 | Henderson |
| 9,162,106 B1 | 10/2015 | Scheiman |
| 9,174,085 B2 | 11/2015 | Foley |
| 9,198,622 B2 | 12/2015 | Kaleal et al. |
| 9,227,103 B2 | 1/2016 | Yang |
| 9,275,504 B1 | 3/2016 | Cooper |
| 9,327,162 B2 * | 5/2016 | Huang ................... A63B 22/06 |
| 9,330,544 B2 | 5/2016 | Levesque et al. |
| 9,358,422 B2 | 6/2016 | Brontman |
| 9,367,668 B2 | 6/2016 | Flynt et al. |
| 9,378,336 B2 | 6/2016 | Ohnemus et al. |
| 9,389,718 B1 | 7/2016 | Letourneur |
| 9,392,941 B2 | 7/2016 | Powch et al. |
| 9,411,940 B2 | 8/2016 | Burroughs et al. |
| 9,452,320 B2 | 9/2016 | Yang |
| 9,457,256 B2 | 10/2016 | Aragones et al. |
| 9,517,812 B2 | 12/2016 | Tetsuka |
| 9,566,469 B1 | 2/2017 | Rector |
| 9,579,534 B2 | 2/2017 | Sutkowski et al. |
| 9,586,085 B2 | 3/2017 | Arnold et al. |
| 9,623,286 B1 | 4/2017 | Chen |
| 9,707,443 B2 | 7/2017 | Warren |
| 9,750,343 B2 | 9/2017 | McBride et al. |
| 9,757,611 B1 | 9/2017 | Colburn |
| 9,782,625 B1 | 10/2017 | Blum et al. |
| 9,827,458 B2 | 11/2017 | Dalton |
| 9,839,807 B2 * | 12/2017 | Golesh ............. A63B 21/00069 |
| 9,845,133 B2 | 12/2017 | Craven et al. |
| 9,886,458 B2 | 2/2018 | Jung et al. |
| 9,950,209 B2 | 4/2018 | Yim et al. |
| 9,987,513 B2 | 6/2018 | Yim et al. |
| 9,990,126 B2 | 6/2018 | Chanyontpatanakul |
| 9,999,818 B2 | 6/2018 | Hawkins, III et al. |
| 10,004,945 B2 | 6/2018 | Sauter |
| 10,039,970 B2 | 8/2018 | Lee et al. |
| 2001/0001303 A1 | 5/2001 | Ohsuga et al. |
| 2002/0055422 A1 | 5/2002 | Airmet |
| 2003/0073545 A1 | 4/2003 | Liu |
| 2003/0148853 A1 | 8/2003 | Alessandri |
| 2003/0171190 A1 | 9/2003 | Rice |
| 2004/0023761 A1 | 2/2004 | Emery |
| 2004/0180719 A1 | 9/2004 | Feldman |
| 2004/0224740 A1 | 11/2004 | Ball et al. |
| 2005/0049117 A1 | 3/2005 | Rodgers |
| 2005/0143226 A1 | 6/2005 | Heidecke |
| 2005/0245370 A1 | 11/2005 | Boland |
| 2005/0264112 A1 | 12/2005 | Tanaka et al. |
| 2006/0063644 A1 | 3/2006 | Yang |
| 2006/0122035 A1 | 6/2006 | Felix |
| 2006/0128533 A1 | 6/2006 | Ma |
| 2006/0194679 A1 | 8/2006 | Hatcher |
| 2006/0240947 A1 | 10/2006 | Qu |
| 2006/0264286 A1 | 11/2006 | Hodjat |
| 2006/0287089 A1 | 12/2006 | Addington et al. |
| 2007/0038137 A1 | 2/2007 | Arand et al. |
| 2007/0042868 A1 | 2/2007 | Fisher |
| 2007/0049467 A1 | 3/2007 | Lin |
| 2007/0111858 A1 | 5/2007 | Dugan |
| 2007/0123390 A1 | 5/2007 | Mathis |
| 2007/0142183 A1 | 6/2007 | Chang |
| 2007/0161467 A1 | 7/2007 | Lee |

(56) References Cited

U.S. PATENT DOCUMENTS

| | | |
|---|---|---|
| 2007/0190508 A1 | 8/2007 | Dalton |
| 2007/0197345 A1 | 8/2007 | Wallace et al. |
| 2007/0225119 A1 | 9/2007 | Schenk |
| 2007/0238584 A1 | 10/2007 | Lee |
| 2007/0270726 A1 | 11/2007 | Chou |
| 2007/0281828 A1 | 12/2007 | Rice |
| 2007/0298935 A1 | 12/2007 | Badarneh |
| 2007/0298937 A1 | 12/2007 | Shah |
| 2008/0020907 A1 | 1/2008 | Lin |
| 2008/0026838 A1 | 1/2008 | Dunstan et al. |
| 2008/0032864 A1 | 2/2008 | Hakki |
| 2008/0096725 A1 | 4/2008 | Keiser |
| 2008/0103024 A1 | 5/2008 | Habing |
| 2008/0108917 A1 | 5/2008 | Joutras et al. |
| 2008/0139370 A1 | 6/2008 | Charnitski |
| 2008/0155077 A1 | 6/2008 | James |
| 2008/0207407 A1 | 8/2008 | Yeh |
| 2008/0214971 A1 | 9/2008 | Talish |
| 2008/0234112 A1* | 9/2008 | Hernandez ........... A63B 21/012 482/63 |
| 2008/0242511 A1 | 10/2008 | Munoz et al. |
| 2008/0279896 A1 | 11/2008 | Heinen et al. |
| 2008/0293488 A1 | 11/2008 | Cheng et al. |
| 2009/0048493 A1 | 2/2009 | James et al. |
| 2009/0118098 A1 | 5/2009 | Yeh |
| 2009/0128516 A1 | 5/2009 | Rimon et al. |
| 2009/0221405 A1 | 9/2009 | Wang |
| 2009/0221407 A1 | 9/2009 | Hauk |
| 2009/0269728 A1 | 10/2009 | Verstegen et al. |
| 2010/0035726 A1 | 2/2010 | Fisher et al. |
| 2010/0064255 A1 | 3/2010 | Rottler et al. |
| 2010/0069205 A1* | 3/2010 | Lee ................... A63B 21/0051 482/63 |
| 2010/0077564 A1 | 4/2010 | Saier et al. |
| 2010/0081548 A1 | 4/2010 | Labedz |
| 2010/0210418 A1 | 8/2010 | Park |
| 2010/0234185 A1* | 9/2010 | Watt ................... A63B 21/0051 482/8 |
| 2010/0240458 A1 | 9/2010 | Gaiba et al. |
| 2010/0311552 A1 | 12/2010 | Sumners |
| 2010/0323850 A1* | 12/2010 | Bingham, Jr. ....... A63B 21/225 482/63 |
| 2011/0017168 A1 | 1/2011 | Gilpatrick |
| 2011/0131005 A1 | 6/2011 | Ueshima et al. |
| 2011/0143769 A1 | 6/2011 | Jones et al. |
| 2012/0071301 A1 | 3/2012 | Kaylor et al. |
| 2012/0088637 A1* | 4/2012 | Lull ..................... A63B 21/015 482/57 |
| 2012/0088638 A1* | 4/2012 | Lull ..................... A63B 21/015 482/57 |
| 2012/0088640 A1 | 4/2012 | Wissink |
| 2012/0253489 A1 | 10/2012 | Dugan |
| 2012/0258433 A1 | 10/2012 | Hope et al. |
| 2012/0322625 A1 | 12/2012 | Park |
| 2013/0061714 A1 | 3/2013 | Hsiung |
| 2013/0228063 A1 | 9/2013 | Turner |
| 2013/0237383 A1 | 9/2013 | Chen |
| 2013/0346043 A1 | 12/2013 | Mewes et al. |
| 2014/0085077 A1 | 3/2014 | Luna et al. |
| 2014/0123325 A1 | 5/2014 | Jung et al. |
| 2014/0274564 A1 | 9/2014 | Greenbaum |
| 2015/0004579 A1 | 1/2015 | Shelton |
| 2015/0045190 A1 | 2/2015 | Keiser |
| 2015/0177083 A1 | 6/2015 | Redmond |
| 2015/0182781 A1 | 7/2015 | Watterson |
| 2015/0209617 A1 | 7/2015 | Hsiao |
| 2016/0263417 A1* | 9/2016 | Golesh ............. A63B 21/00069 |
| 2016/0263426 A1 | 9/2016 | Mueller et al. |
| 2017/0036053 A1 | 2/2017 | Smith et al. |
| 2017/0259111 A1 | 9/2017 | Hsieh |
| 2017/0312580 A1 | 11/2017 | Chang |
| 2017/0319906 A1 | 11/2017 | Chang |
| 2018/0117393 A1 | 5/2018 | Ercanbrack |
| 2018/0200566 A1* | 7/2018 | Weston ............. A63B 22/0046 |

FOREIGN PATENT DOCUMENTS

| | | |
|---|---|---|
| CN | 202724550 | 2/2013 |
| CN | 203329268 | 12/2013 |
| CN | 104138651 | 11/2014 |
| EP | 2471580 | 6/2013 |
| TW | M374886 | 3/2010 |
| TW | M435942 | 8/2012 |
| TW | M460687 | 9/2013 |

\* cited by examiner

EMERGENCY STOP WITH MAGNETIC BRAKE FOR AN EXERCISE DEVICE

CROSS-REFERENCE TO RELATED APPLICATIONS

This application claims priority to U.S. Provisional Patent Application No. 62/202,595 filed on Aug. 7, 2015, which application is herein incorporated by reference for all that it discloses.

BACKGROUND

Aerobic exercise is a popular form of exercise that improves one's cardiovascular health by reducing blood pressure and providing other benefits to the human body. Aerobic exercise generally involves low intensity physical exertion over a long duration of time. Typically, the human body can adequately supply enough oxygen to meet the body's demands at the intensity levels involved with aerobic exercise. Popular forms of aerobic exercise include running, jogging, swimming, and cycling among others activities. In contrast, anaerobic exercise typically involves high intensity exercises over a short duration of time. Popular forms of anaerobic exercise include strength training and short distance running.

Many choose to perform aerobic exercises indoors, such as in a gym or their home. Often, a user uses an aerobic exercise machine to have an aerobic workout indoors. One such type of aerobic exercise machine is a stationary bicycle. Generally speaking, stationary bicycles include a resistance mechanism that resists the rotation of foot pedals in a crank assembly. Other popular exercise machines that allow a user to perform aerobic exercises indoors include elliptical machines, rowing machines, stepper machines, and treadmills to name a few.

One type of stationary bicycle is described in U.S. Pat. No. 8,585,561 issued to Jonathan B. Watt. In this reference, an exercise bike is described as including a magnetic braking system to resist rotation of a flywheel. The magnetic braking system may be magnets mounted on brackets that are selectively pivoted relative to the frame to increase or decrease the resistance opposing rotation of the flywheel. The brackets may be pivoted using a brake adjustment assembly joined to the brackets in such a manner that the magnetic forces resisting rotation of the flywheel increase or decrease in a proportional manner over at least a portion of the adjustment range of the brake adjustment assembly. As a friction brake pad engages the flywheel, the magnets also overlap the flywheel. Thus, in addition to the friction force applied to the flywheel that resists rotation of the flywheel, the rotation of the flywheel is also resisted by the eddy current brake. Because of this additional eddy current braking force, the force that needs to be applied between the brake pads and the flywheel for the friction brake to stop the flywheel within a given time period for a given cadence may be less than the force required for a comparable friction brake alone. In other words, it may take less force input from the user to stop the flywheel in a given time period with the friction brake when combined with the eddy current brake than it does when the friction brake is not combined with an eddy current brake.

SUMMARY

In one embodiment of the present invention, a control mechanism includes a friction brake assembly. The friction brake assembly includes a push rod and a friction pad connected to the push rod. The control mechanism also includes a magnetic resistance assembly. The magnetic resistance assembly includes a rotatable sleeve, a movable housing in contact with the rotatable sleeve, and at least one magnet disposed within the movable housing. The control mechanism also includes a knob in mechanical communication with both the push rod and the rotatable sleeve.

The control mechanism may include a return mechanism in communication with the push rod.

The knob may be rotationally isolated from the push rod.

The sleeve may include at least one spline that interlocks with an inside surface of the knob and allows for axial movement of the knob with respect to the sleeve.

The rotatable sleeve may be rotationally interlocked with the knob so that the rotatable sleeve rotates when the knob rotates.

The rotatable sleeve may cause the movable housing to be pushed towards a flywheel when the knob is rotated in a first direction.

The rotatable sleeve may include a sleeve threaded portion.

The control mechanism may include a worm gear where the sleeve threaded portion is intermeshed with the worm gear.

The control mechanism may include a movement sensor where the movement sensor is attached to the worm gear.

The control mechanism may include a stationary housing and a housing threaded portion where the sleeve threaded portion is intermeshed with the housing threaded portion.

The control mechanism further may include a threaded mover intermeshed with a sleeve threaded portion, wherein the threaded mover is in contact with the movable housing.

In one embodiment of the invention, an exercise device includes a crank assembly. The crank assembly includes a pedal, a pedal arm connected to a pedal, and a flywheel connected to the pedal arm. The exercise device also includes a friction brake assembly. The friction brake assembly includes a push rod and a friction pad connected to the push rod. The friction pad is proximate to the flywheel so that upon activation of the push rod, the friction pad engages the flywheel. The exercise device also includes a magnetic resistance assembly. The magnetic resistance assembly includes a rotatable sleeve, a movable housing in mechanical communication with the rotatable sleeve, and at least one magnet disposed within the movable housing. The movable housing is proximate the flywheel and a knob is in mechanical communication with both the push rod and the rotatable sleeve.

The exercise device may include a return spring in communication with the push rod.

The knob may be rotationally isolated from the push rod.

The sleeve may include at least one spline that interlocks with an inside surface of the knob and allows for axial movement of the knob with respect to the sleeve.

The rotatable sleeve may be rotationally interlocked with the knob so that the rotatable sleeve rotates when the knob rotates.

The rotatable sleeve may cause the movable housing to move in an axial direction when the knob is rotated in a first direction.

The rotatable sleeve may include a sleeve threaded portion.

The movable housing pivots when the knob is rotated.

In one embodiment of the invention, an exercise device includes a crank assembly. The crank assembly includes a pedal, the pedal connected to a pedal arm, and a flywheel connected to the pedal arm. The exercise device also includes a friction brake assembly. The friction brake assembly includes a push rod and a friction pad connected to the push rod. The friction pad is also proximate to the flywheel so that upon activation of the push rod, the friction pad engages the flywheel. The exercise device also includes a magnetic resistance assembly. The magnetic resistance assembly include a rotatable sleeve, a threaded mover threadedly connected to an end of the rotatable sleeve, and a movable housing in contact with the threaded mover. The sleeve includes at least one spline that interlocks with an inside surface of the knob and allows for axial movement of a knob with respect to the sleeve. The rotatable sleeve is rotationally interlocked with the knob so that the rotatable sleeve rotates when a knob rotates. The rotatable sleeve pushes the threaded mover in an axial direction when the knob is rotated in a first direction where the threaded mover pushes the movable housing. At least one magnet is disposed within the movable housing. The movable housing is proximate the flywheel, and the knob is in mechanical communication with both the push rod and the rotatable sleeve. The knob is rotationally isolated from the push rod. A return spring is in communication with the push rod.

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

Throughout the drawings, identical reference numbers designate similar, but not necessarily identical, elements.

DETAILED DESCRIPTION

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other movement of one component affect the position of the other.

Figure 1:
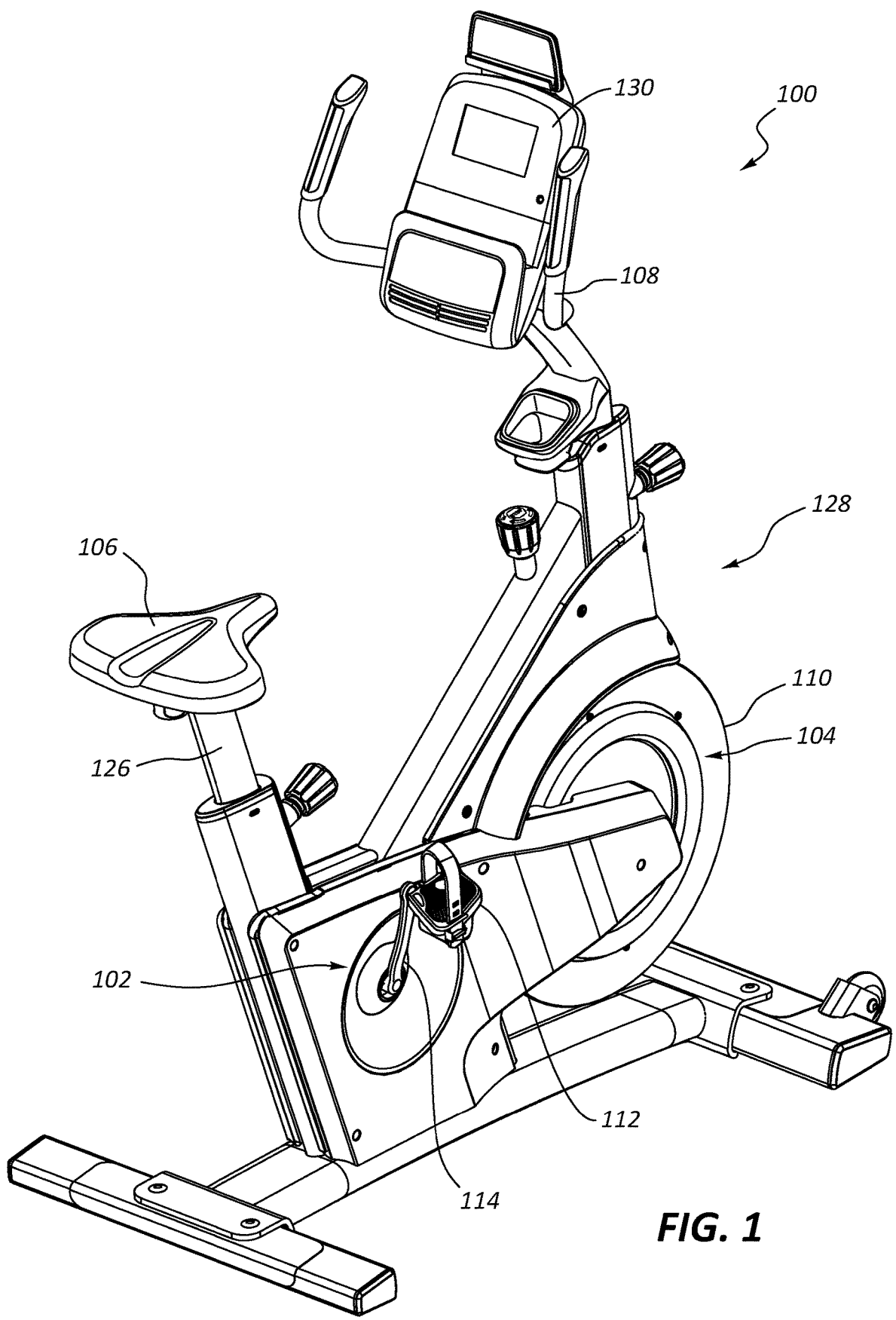
FIG. 1 illustrates a side view of an example of an exercise device in accordance with the present disclosure.

Particularly, with reference to the figures, FIG. 1 depicts an example of a stationary bicycle 100. In this example, the stationary bicycle 100 includes a crank assembly 102 connected to a resistance mechanism 104. The stationary bicycle 100 also includes a seat 106 and handle bars 108.

The resistance mechanism 104 may include a flywheel 110 that is connected to the crank assembly 102. The crank assembly 102 may include a first pedal 112 connected to a first pedal arm 114, and a second pedal 116 connected to a second pedal arm. The first and second pedal arms may include a pedal end and an axle end. The axle ends of the first and second pedal arms may connect to an axle of the flywheel 110.

The stationary bicycle 100 may also include a seat 106. The seat 106 may be connected to a seat beam 126 that is adjustably attached to a body of the stationary bicycle 100.

The handle bars 108 may be attached to a front portion 128 of the stationary bicycle 100. In this example, the handle bars 108 are connected on either side of a console 130 that may depict information to the user. The console 130 may include a screen that depicts the information such as an exercise time duration, miles travel, calories burned, speed, other types of information, or combinations thereof. Also, the console 130 may include at least one input, such as a speed input, a resistance input, another type of input, or combinations thereof.

The stationary bicycle 100 may also include a control mechanism 132. The control mechanism 132 includes a knob 134 for stopping the movement of the flywheel 110 or adjusting the resistance applied to the flywheel 110.

Figure 2:
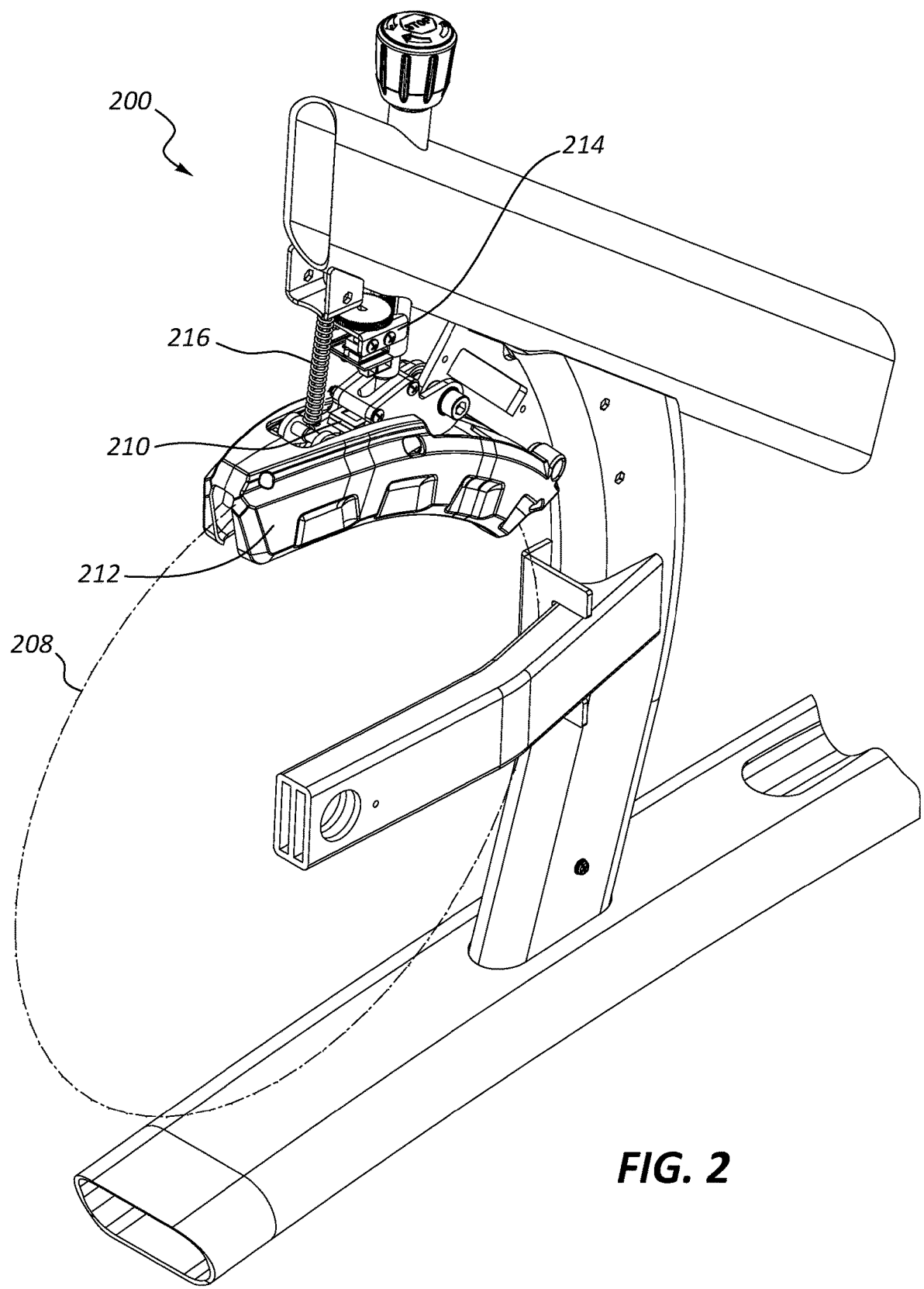
FIG. 2 illustrates a perspective view of an example of a control mechanism in accordance with the present disclosure.

FIG. 2 depicts an example of the control mechanism 200. In this example, the knob 202 is movably connected to a frame member of the stationary bicycle. The knob 202 is connected to push rod and other components that span the cross sectional thickness of the frame member. In this example, movement of the knob 202 can control and/or influence the parameters associated with the flywheel 208, which is located underneath the frame member. For example, the friction pad 210 is connected to the push rod. In those circumstances where the knob 202 is pushed inward towards the frame member, the friction pad 210 is moved towards the flywheel 208. In those cases where the knob 202 is pushed far enough inward, the friction pad 210 is also pushed sufficiently far enough towards the flywheel 208 to engage the circumference of the flywheel 208. With the friction pad 210 engaged against the circumference of the flywheel 208, the friction pad 210 resists the flywheel's movement, thus affecting the rotational speed of the flywheel 208.

The knob 202 can also be rotated to independently affect the magnetic resistance of the flywheel 208. A movable housing 212 is located underneath the frame member. At least one magnet is located inside of the movable housing 212. The magnets are customized to exert a magnetic flux on the flywheel 208 which increases the amount of energy needed to rotate the flywheel 208. When the movable housing 212 is moved farther away from the flywheel 208, the amount of magnetic flux felt by the flywheel 208 is reduced lowering the amount of energy needed to rotate the flywheel. Conversely, as the movable housing 212 and thus the magnets is moved closer to the flywheel 208, the amount energy needed to move the flywheel 208 increases.

The movable housing 212 can be moved closer to or farther away from the flywheel 208 by rotating the knob 202.

A return spring 216 can apply an upward force on the movable housing when the control mechanism is not pushing against the movable housing. Further, a sensor 214 may be used to determine the position of the control mechanism's internal components. The internal components of the control mechanism 200 is described in more detail below in conjunction with the following figures.

Figure 3:
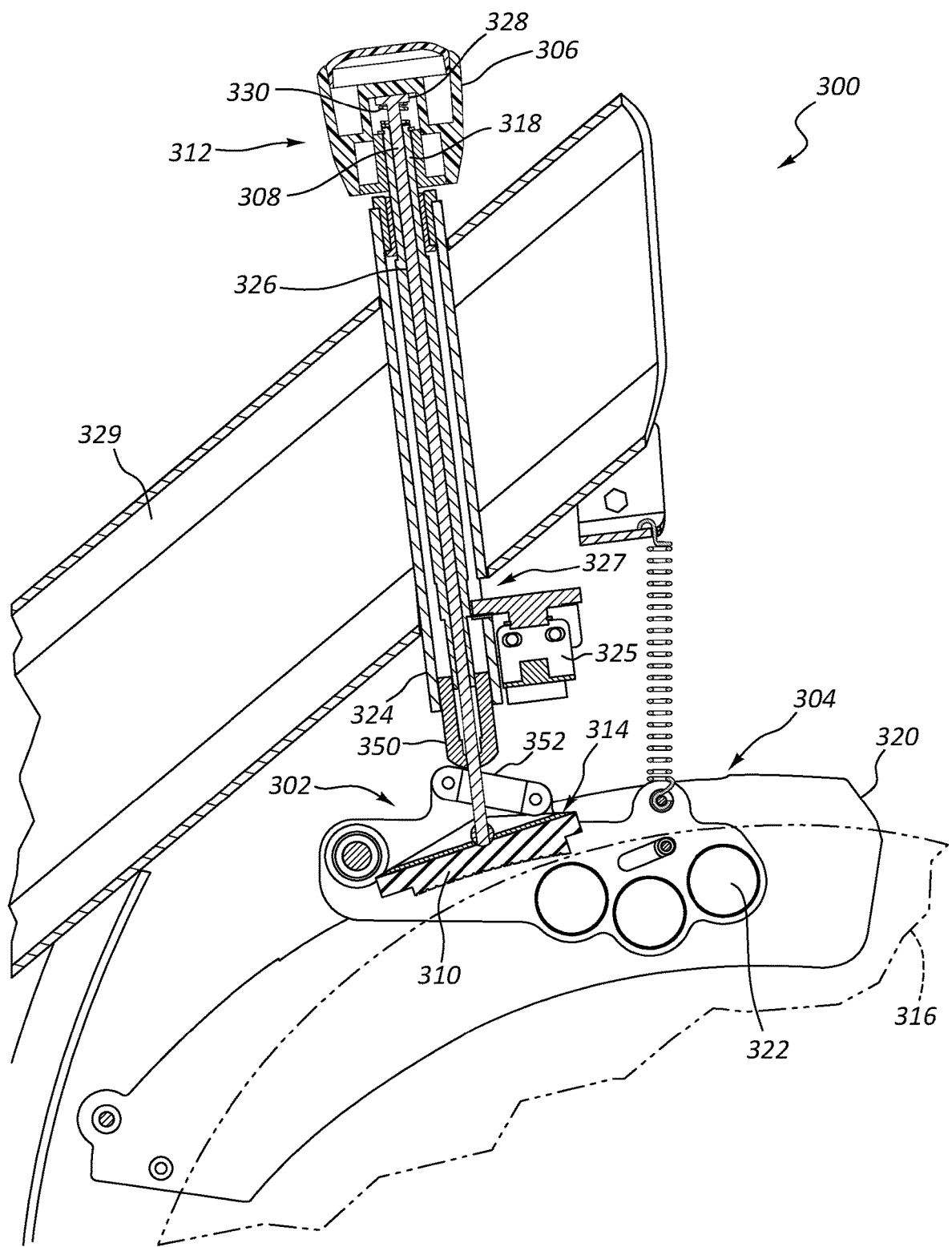
FIG. 3 illustrates a cross sectional view of an example of a control mechanism in accordance with the present disclosure.

FIG. 3 depicts a cross sectional view of an example of the control mechanism 300. In this example, the control mechanism 300 includes a friction brake assembly 302 and a magnetic resistance assembly 304. A knob 306 is in mechanical communication with both the friction brake assembly 302 and the magnetic resistance assembly 304.

The friction brake assembly 302 includes a push rod 308 and a friction pad 310 connected to the push rod 308. The knob 306 can be connected to a push rod 308 at a first push rod end 312. The push rod 308 also includes a second push rod end 314 that is connected to a friction pad 310. The knob 306 is movable in a direction that is co-axial with the push rod 308 and thus includes multiple positions. In a first axial position, the knob 306 is spaced away and removed a distance from the first push rod end 312. But, in a second axial position, the knob 306 contacts the first push rod end 312 and applies an axially force on the push rod 308, which moves the friction pad 310 into the flywheel 316.

The magnetic resistance assembly 304 includes a rotatable sleeve 318, a movable housing 320 in contact with the rotatable sleeve 318, and at least one magnet 322 disposed within the movable housing 320. The knob 306 is splined with the rotatable sleeve 318 so that the knob 306 and the rotatable sleeve 318 can move axially with respect to one another, but are interlocked rotationally with each other. Thus, as the knob 306 rotates, the rotatable sleeve 318 also rotates. The rotatable sleeve 318 is threaded with a stationary housing 324. The rotatable sleeve 318 includes a sleeve threaded portion 325 that is in communication with a sensor 327.

The rotatable sleeve 318 has a bore 326 that is defined by the sleeve's inside surface. The push rod 308 is partially disposed within the bore 326 along the length of the bore 326. Thus, the length of the push rod 308 passes through the frame member 329 and the rotatable sleeve 318.

In this example, the knob 306 is in an initial position and therefore the friction pad 310 is in a retracted position being spaced away from the flywheel 316 so that there is no contact between the friction pad 310 and the flywheel 316. In this circumstance, the friction pad 310 does not exert friction on the flywheel 316 or otherwise exert a mechanical influence on the rotation of the flywheel 316. A return spring 330 is positioned within a cavity defined in an underside 328 of the knob 400 and is connected to an annular face connected to the rotatable sleeve 318. In the absence of a push down force, the return spring 330 pushes the knob 306 up to the initial position.

A threaded mover 350 is attached to a far end of the rotatable sleeve 318. The threaded mover 350 intermeshes with a distal threaded portion on the outside of the rotatable sleeve 318. As the rotatable sleeve moves, the threaded mover 350 moves in either a first axial direction or in a second axial direction. In one of the axial directions, the threaded mover may move towards the flywheel and in the other axial direction, the threaded mover may move away from the flywheel. The threaded mover 350 may be in contact with a surface of the movable housing the contains the magnets. As a result, as the threaded mover 350 moves, the movable housing may also move either towards or away from the flywheel.

Figure 4:
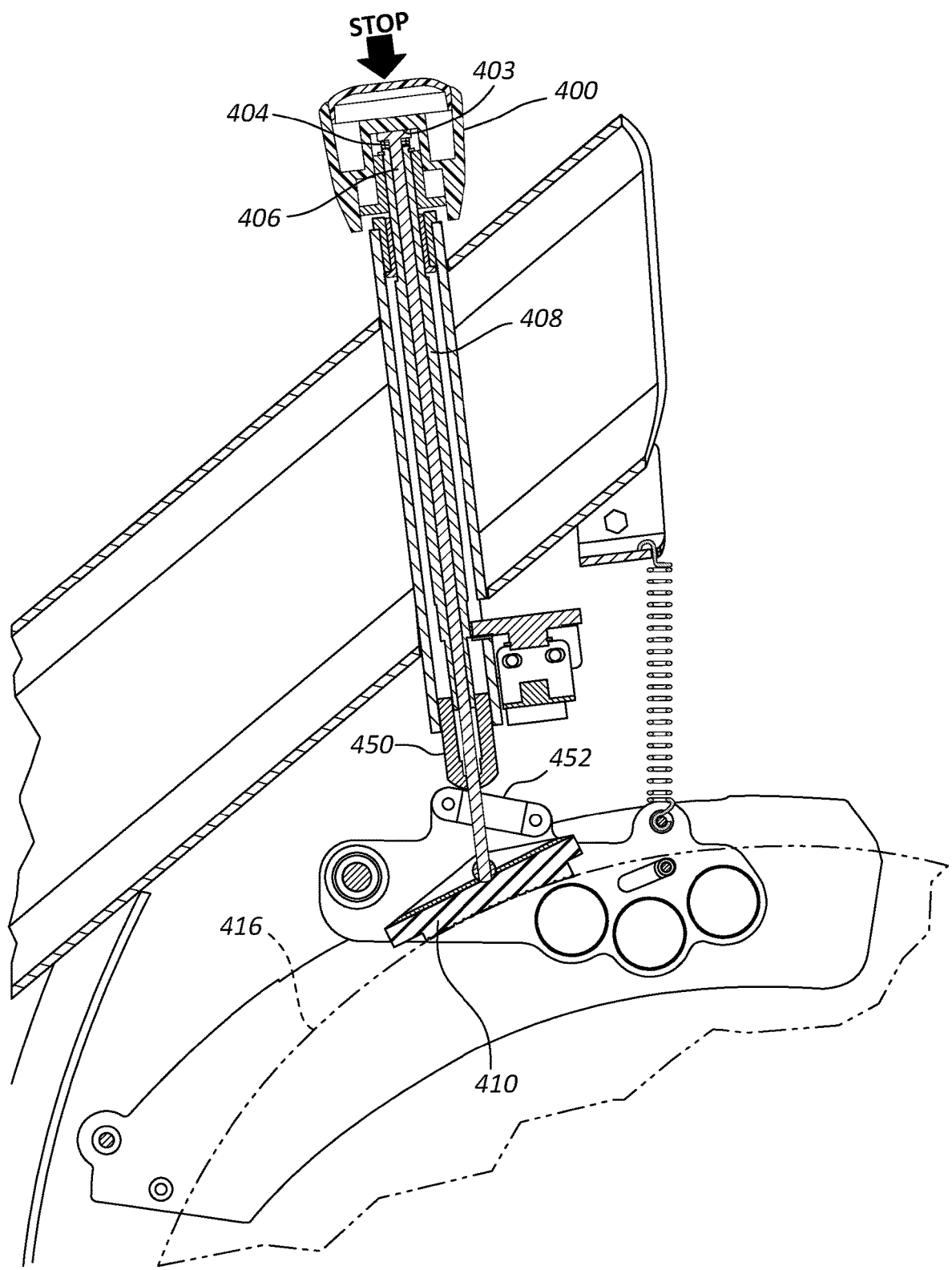
FIG. 4 illustrates a cross sectional view of an example of a control mechanism in accordance with the present disclosure.

FIG. 4 depicts an example of the knob 400 pushed towards the frame member. In this example, the knob's underside 403 compresses the return spring 404 and the push rod 406 is pushed towards the flywheel. Consequently, the push rod 406 pushes the friction pad towards the flywheel, and when pushed far enough, the friction pad makes direct contact with the flywheel and exerts friction to the flywheel that resists the flywheel's rotation.

The knob 400 is splined to the rotatable sleeve 408. The push rod 406 traverses the sleeve's bore as it moves with the axial movement of the knob 400. But, the rotatable sleeve does not move with the axial movements of the knob 400. Rather, the knob 400 moves axially along the splines that interlock the knob 400 and the rotatable sleeve 408. In some cases, the push rod 406 is rotationally independent of the knob 400. In this example, the underside 403 of the knob 400 may not have a physically connection with the push rod 406 until the knob 400 is pushed into the push rod 406. In the initial position, a gap may exist between the knob's underside 403 and the push rod. Thus, when the knob 400 is rotated, the push rod 406 may remain stationary with respect to the knob 400. In other examples, the push rod 406 may have a rotary connection to the knob's underside 403. In this example, the push rod 406 also remains stationary with respect to the knob 400 as the knob 400 rotates around the push rod 406.

When the knob 400 is pushed down, the push rod 406 pushes the friction pad 410 into the flywheel 416 to slow down or prevent movement of the flywheel 416. But, when the push rod 406 moves axially, the location of the threaded mover 450 on the far end of the push rod 406 is not moved. Thus, the surface 452 of the movable housing on which the threaded mover pushes does not move as a result of the axial movement of the push rod 406.

Figure 5:
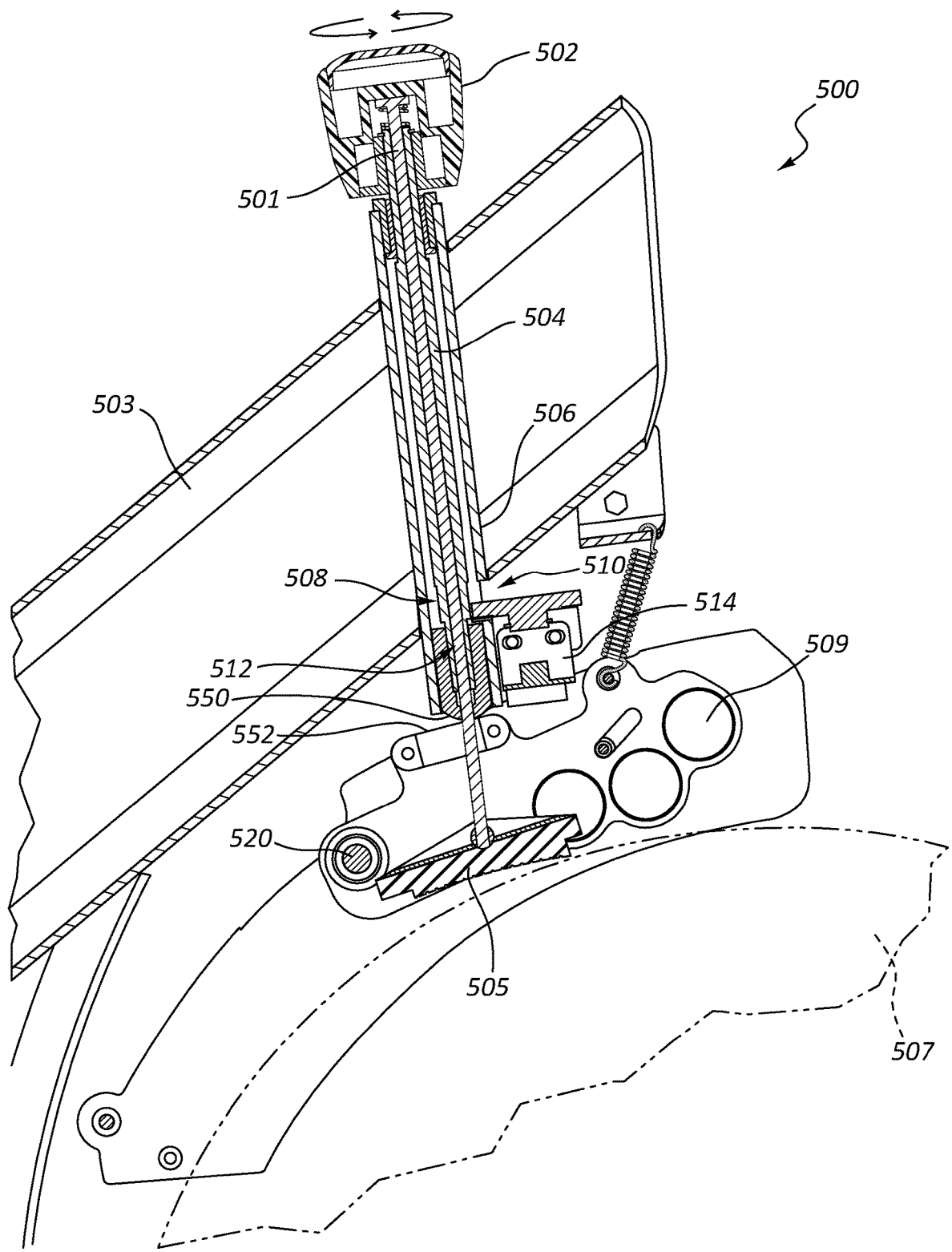
FIG. 5 illustrates a cross sectional view of an example of a control mechanism in accordance with the present disclosure.

FIG. 5 is a cross section of an example of the control mechanism 500. In this example, the knob 502 is being rotated in a first rotary direction. The knob 502 is connected to a rotatable sleeve 504 through a spline connection. Thus, as the knob 502 rotates, the rotatable sleeve 504 rotates with the knob 502.

In this example, the push rod 501 is disposed within the rotatable sleeve 504. As described above, the push rod 501 can be moved independently of the rotatable sleeve 504 when the control mechanism's knob is pushed towards the frame member 503. In these situations, the friction pad 505 can be pushed into the flywheel 507 without affecting the position of the movable housing 518 that contains the magnets 509. The rotatable sleeve 504 is disposed within a stationary housing 506. A threaded portion 508 of the rotatable sleeve 504 is adjacent to an opening 510 defined in the stationary housing 506. A worm gear 512 is connected to the threaded portion 508, and a sensor 514 is connected to the worm gear 512 that measures the position and/or movement of the rotatable sleeve 504.

The threaded mover 550 moves in an axial direction as the rotatable sleeve 504 rotates. When the knob is rotated so that the threaded mover 550 moves in an upward axial direction, the threaded mover 550 pulls away a surface 552 of the movable housing 518. The spring 516 applies an upward force on the movable housing 518 so the movable housing 518 moves up as the threaded mover 550 retracts. The movable housing 518 is supported on a first side with a pivot 520. A spring 516 connects the movable housing 518 to the frame member to return the movable housing 518 to an upward position when the threaded mover 550 is not exerting an axial force on the movable housing 518. As a result, the movable housing 518 pivots away from the flywheel 507 as the knob 502 rotates in the other direction.

Figure 6:
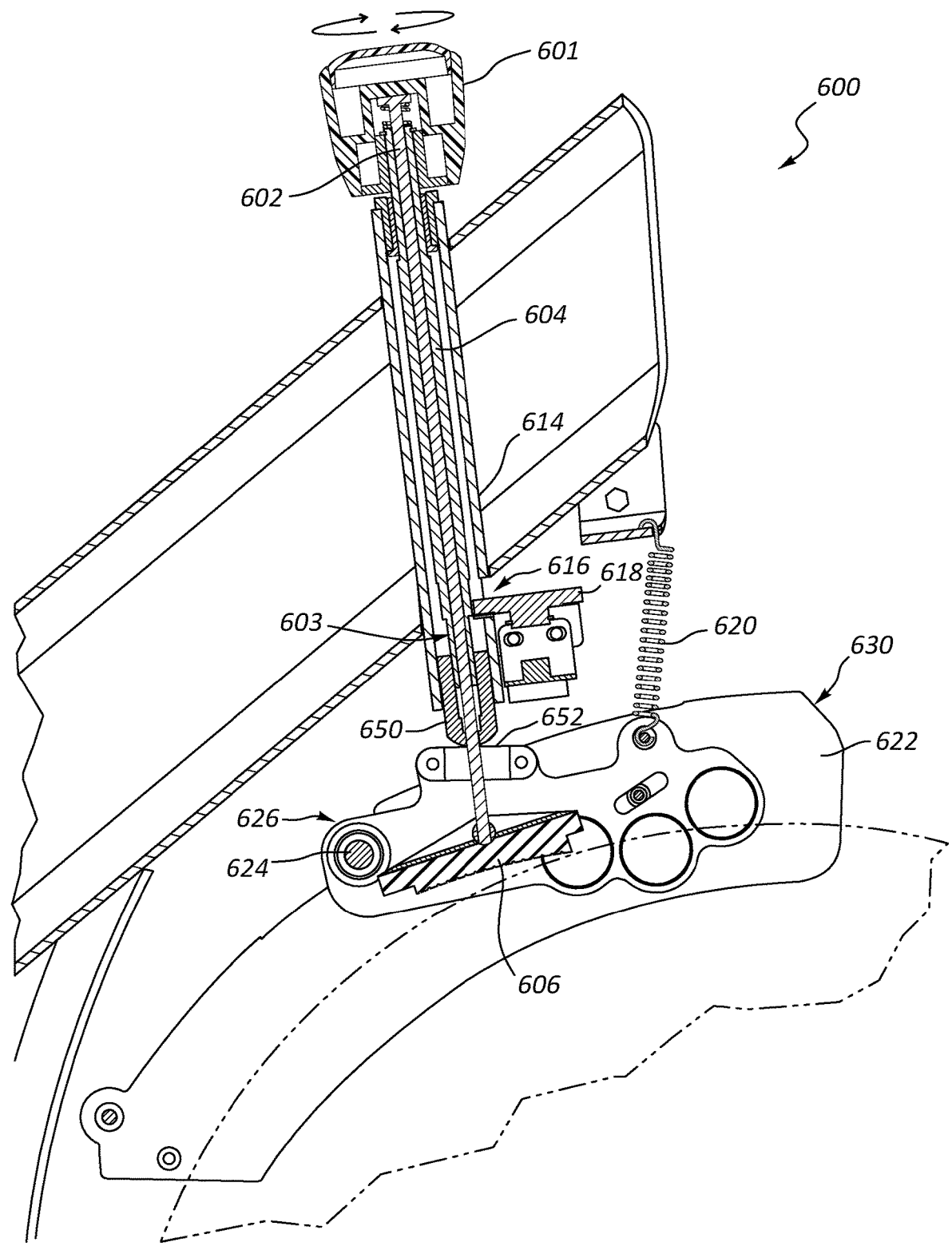
FIG. 6 illustrates a cross sectional view of an example of a control mechanism in accordance with the present disclosure.

FIG. 6 depicts an example of the control mechanism 600. When the knob 601 is rotated, the splines of the knob 601 and rotatable sleeve 604 are interlocked to cause the rotatable sleeve 604 to rotate with the knob 601. The threaded portion 603 in the distal end of the rotatable sleeve 604 causes the threaded mover 650 to translate in an axial direction. In situations where the knob 601 is turned in a direction that causes the threaded mover 650 to move in a downward axial direction, the threaded mover 650 pushes against a surface 652 of the movable housing 622 so that the movable housing 622 moves towards the flywheel. In this example, a worm gear 616 is in mechanical communication with rotatable sleeve 604 and connects a sensor 618 to the rotatable sleeve 604 to determine a position of the rotatable sleeve 604.

The return spring 620 is connected to the frame member. The movable housing 622 may be supported with a pivot rod 624 on a first end 626, a protrusion that intersects a slot defined in the movable housing's second end 630, and the return spring 620. Meanwhile, the axial positions of the push rod 602 and the friction pad 606 are unaffected by the rotation of the rotatable sleeve 604, the movement of the threaded mover 650, and the movement of the movable housing 622.

GENERAL DESCRIPTION OF THE INVENTION

In general, the invention disclosed herein may provide an exercise device with a control mechanism that adjusts at least some of the parameters of the exercise device. The exercise device may be a stationary bicycle. In this example, the stationary bicycle may include a crank assembly that has a first pedal and a second pedal that are connected to a resistance mechanism through a first crank arm and a second crank arms, respectively. A user may position himself or herself over the pedals by sitting on a seat incorporated into the stationary bicycle. The user may also use handle bars while using the exercise machine. A console may also be incorporated into the stationary bicycle. The console may track information such as the number of calories estimated to be burned by the user during his or her workout, the rotary speed that the stationary bicycle's flywheel, the distance traveled by the flywheel, the resistance applied to the flywheel, a physiological parameter of the user, another type of information, or combinations thereof.

The control mechanism may include a friction brake assembly and a magnetic resistance assembly. Both the friction brake assembly and the magnetic resistance assembly may be used by the user through a single knob. The knob may connect to components that are located in a stationary housing that is incorporated into a frame member of the stationary bicycle. This frame member may be positioned adjacent to the flywheel. The knob may be positioned so that the knob is in a convenient reach for the user while the user is operating the stationary bicycle.

In some examples, when the user pushes inward on the knob towards the frame member and/or towards the flywheel, the control mechanism stops the rotation of the flywheel or prevents the rotation of the flywheel. Further, in some examples, when the user rotates the knob, the magnetic resistance applied to the flywheel is adjusted. Stopping the flywheel and adjusting the magnetic resistance are two independent operations that do not affect each other. For example, when the magnetic resistance is adjusted by rotating the knob, the control mechanism's friction pad is not employed. Similarly, when the emergency stop features (i.e. friction pad) of the control mechanism are employed by pushing inward on the knob, the magnetic resistance applied to the flywheel is not changed. Thus, the emergency stop features and the magnetic resistance features are independent of each other.

The friction brake assembly may include a push rod and a friction pad connected to the push rod. The push rod may be disposed within a bore of a rotatable sleeve that is used primarily in the magnetic resistance features of the control mechanism. The push rod has a first end that is positioned adjacent to an underside of the knob, and a second end that is connected to the friction pad. The friction pad may be positioned adjacent to the flywheel.

The knob may have a first initial position that allows movement of the flywheel and a second pushed position that causes the flywheel to be locked in place. When the knob is in the first initial position, the knob's underside is urged upward with a compression spring. In this condition, the spring may push the underside far enough that there is no contact between the push rod and the knob's underside. Under these conditions, the push rod is not affected by the rotational movement of the knob. Thus, the user can rotate the knob without affecting the push rod. In alternative examples, the push rod may be connected to the underside of the knob, but this connection allows the push rod to be rotationally isolated from the knob.

When the knob is push in towards the frame member and/or the flywheel, the underside of the knob contacts the push rod and pushes the push rod in an axial direction. In some examples, a majority of the push rod is disposed within the rotatable sleeve, and the push rod moves along the length of the rotatable sleeve's bore as the knob pushes the push rod in the axial direction. The friction pad connected to the other end of the push rod is moved closer to the flywheel as the knob is pushed inward. In some examples, the knob is pushed in far enough that the friction pad is made to contact the flywheel. When the user exerts enough force to push the knob inward, the friction pad can be pushed into the flywheel with a force sufficient to prevent the flywheel from moving.

The friction pad can be connected to the push rod with a pivot connection. The pivot connection allows the friction pad to adjust its angle to make full contact with the circumference of the flywheel. In some examples, the friction pad has an arcuate surface that matches the profile of the flywheel. With the friction pad engaged with the flywheel's circumference, friction can be generated between the friction pad and the flywheel that at least slows the flywheel's momentum. If the force on the knob is sufficient enough, the friction pad contacts the flywheel's circumference with a sufficient force to prevent the flywheel from further rotational movement.

The control mechanism also includes an independent magnetic resistance assembly that is also controlled with the knob. The magnetic resistance assembly includes a rotatable sleeve, a movable housing in contact with the rotatable sleeve, and at least one magnet is disposed within the movable housing.

In some examples where the push rod is not in contact with the underside of the knob when the knob is in the initial position, the knob may be in contact with the rotatable sleeve while the knob is in the initial position. In fact, the knob may also be in contact with the rotatable sleeve regardless of the knob's axial position. For example, the knob may be connected to the rotatable sleeve through a spline connection. This spline connection may allow the knob to be rotationally interlocked with the rotatable sleeve while at the same time being able to slide along the length of the splines with respect to the rotatable sleeve. Thus, when the knob is pushed inward, the knob may still be rotationally connected to the rotatable sleeve. Any appropriate type of spline connection may be used in accordance with the principles described herein. For example, a non-exhaustive list of spline type connections may include a parallel key spline connection, an involute spline connection, a crowned spline connection, a helical spline connection, a ball spline connection, another type of spline connection, or combinations thereof.

Thus, as the knob rotates, the rotatable sleeve also rotates. In some examples, the rotatable sleeve has a length that is approximately the length of the stationary housing. The rotatable sleeve may have an outside surface that has a characteristic of generating little friction with the inside surface of the stationary housing. In some examples, the rotatable sleeve is centered within the stationary housing with rotary bearings. These rotary bearings reduce the friction as the rotatable sleeve rotates. Further, the rotary bearings can space the outside surface of the rotatable sleeve away from the inside surface of the stationary housing, which prevents friction from developing between each other.

The push rod may also be insulated from the rotation of the rotatable sleeve through a low friction inner surface of the rotatable sleeve and a low friction surface on the outside of the push rod. In other examples, rotary bearings, like the rotary bearings described between the outside of the rotatable sleeve and the inside of the stationary housing, may be used to reduce and/or eliminate friction between the push rod and the rotatable sleeve. Also in some examples, a lubricant, such as grease or an oil, may be used to reduce friction between the rotatable sleeve and the stationary housing and/or the push rod. While these examples have been described with reference to specific mechanisms for reducing and/or eliminating the friction between the component in contact with the rotatable sleeve, any appropriate mechanism for reducing friction may be used in accordance to the principles described in the present disclosure.

In some examples, the push rod may have a greater length than the rotatable sleeve within the stationary housing. In this example, the push rod may come into contact with the inside surface of the stationary housing. In such a circumstance, the push rod may be splined to the stationary housing to prevent the push rod from rotating with the rotatable sleeve.

In yet other examples, the push rod may rotate with the rotatable sleeve. In this situation, the push rod may have a rotary connection to the friction pad so that the friction pad does not rotate with the push rod and/or the rotatable sleeve. In other words, the friction pad does not rotate and/or move when the knob is rotated.

In some cases, the rotatable sleeve includes a threaded portion. In these cases, the stationary housing may include an opening that exposes the threaded portion to outside of the stationary housing. This threaded portion may be connected to components outside of the stationary housing so that the rotational movement of the rotatable sleeve can be used to actuate a component of the exercise device.

In some circumstances, a worm gear is partially disposed in the opening so that the worm gear is in communication with a threaded portion of the rotatable sleeve. The worm gear may be connected to a sensor. In those examples, the sensor can be used to determine a precise location of the rotatable sleeve. Because the movable housing's position can be determined from the movement of the rotatable sleeve, the sensor may be used to determine the location of the movable housing. In other circumstances where the movable housing includes magnets that affect the magnetic resistance applied to the flywheel, the readings of the sensor can be used to determine or refine the resistance value that is displayed in the exercise device's console. While these above examples have been described with a specific mechanism for determining the resistance value to display in the console, any appropriate mechanism for determining the resistance value may be used in accordance with the principles described herein. For example, the resistance value may be determined through a load cell sensor, a strain gauge, a piezoelectric device, a magnetic sensor, another type of mechanism, or combinations thereof.

A rotatable sleeve may also include another threaded portion that is located on the distal end of the rotatable sleeve. A threaded mover may be attached to this distal threaded portion so that the threaded mover moves axially as the rotatable sleeve rotates. Thus, when the rotatable sleeve rotates in a first direction, the threaded mover may move out of the distal end of the stationary housing, and when the rotatable sleeve moves in a second direction, the treaded mover may retract into the stationary housing. When the threaded mover moves out of the stationary housing, the threaded mover may push against a surface of the movable housing. Thus, as the threaded mover moves out of the stationary housing, the threaded mover may cause the movably housing to move towards the flywheel. A return spring may urge the movable housing in an upward direction. When the movable housing is pushed with the threaded mover, the force from the return spring may be overcome and the movable housing moves towards the flywheel. But, when the threaded mover moves away from the threaded housing, the force from the return spring may cause the movable housing to move in an upward direction causing the movable housing to pivot away from the flywheel.

In alternative examples, a carrier is connected the worm gear where the worm gear moves in an axial direction when the rotatable sleeve rotates. In these examples, the carrier may be connected to a linkage that is in communication with the movable housing. The linkage may cause the movable housing to move based on the movement of the carrier. Thus, when the knob is rotated in a first rotary direction, the rotatable sleeve is likewise moved in the first rotary direction, which causes the carrier to move in the first axial direction and results in the movable housing also moving along with the carrier. Similarly, the movable housing is moved along with the carrier in a second direction as the knob is rotated in the second rotational direction.

Any appropriate type of linkage between the carrier and the movable housing may be used in accordance with principles described in the present disclosure. For example, the linkage may be a spring. Each end of the spring may include a hook. A first hook on a first end of the spring may latch onto a protrusion or opening in the carrier. Likewise, a second hook on a second end of the spring may latch onto a protrusion or opening in the movable housing. In other examples, a rigid rod may connect the carrier to the movable housing. In this example, the rigid rod may include a first pivot connection to the carrier on a first end of the rigid rod and a second pivot connection to the movable housing on a second end of the rigid rod.

In some cases, the movable housing is supported with a pivot on a first side and connected to the linkage on a second side. Thus, as the linkage moves in an axial direction based on the rotation of the rotatable sleeve, the movable housing pivots in the general direction of the axial direction. An advantage of having the movable housing pivot toward and away from the flywheel is that the weight of the movable housing is at least partially supported by a stationary structure that supports the pivot rod.

The movable housing may include multiple magnets that are positioned to impose a magnetic influence on the flywheel. As the magnets get closer to the flywheel, the magnets imposed a greater magnetic force on the flywheel that makes rotating the flywheel more difficult. As the magnets move farther away from the flywheel, less energy is needed to rotate the flywheel. Thus, when the knob is rotated in a first direction, the movable housing can be moved closer to the flywheel thereby increasing the magnetic resistance on the flywheel. Similarly, when the knob is rotated in a second direction, the movable housing can move away from the flywheel lowering the magnetic resistance resisting the flywheel's rotation.

In some cases, the movable housing includes just a single magnet. In other examples, the movable housing includes more than one magnet. In one particular embodiment, the movable housing includes a slot with a first slot wall and a second slot wall. As the movable housing is directed closer to the flywheel, the slot surrounds an edge of the flywheel. In this circumstance, the first slot wall and the second slot wall overlap with the edge of the flywheel. Magnets may be placed in the first and second slot walls so that the magnets also overlap with the edge of the flywheel. In this example, the magnets can impose a magnetic resistance into both sides of the flywheel and not just onto the flywheel's circumference. But, in other examples, the magnets impose a resistance to just the flywheel's circumference, to just one side of the flywheel, to just another portion of the flywheel, or combinations thereof.

While the above examples have been described with specific types of knobs, any appropriate type of knob may be used in accordance with the principles described in the present disclosure. For example, the knob may include a generally cylindrical shape, a generally bulbous shape, a generally square shape, a generally triangular shape, a generally spherical shape, an asymmetric shape, another type of shape, or combinations thereof. Further, the examples above have been described with reference to specific types of return mechanisms for returning the knob to the initial position. But, any appropriate return mechanism may be used in accordance with the principles described herein. For example, the return mechanism may include a compression spring mechanism, a tension spring mechanism, a wave spring mechanism, a hydraulic mechanism, a pneumatic mechanism, another type of mechanism, or combinations thereof.

While the examples above have been described with a stationary bicycle with a specific type of resistance mechanism, any appropriate type of stationary bicycle may be used in accordance with the principles described in the present disclosure. For example, the stationary bicycle may include a magnetic resistance mechanism, a pneumatic resistance mechanism, a hydraulic resistance mechanism, a gear type resistance mechanism, a pair of braking pads, a tensioning element, a fan blade, another type of resistance mechanism, or combinations thereof. While the examples above have been described with reference to stationary bicycles, the principles described herein may be incorporated into other types of exercise or recreational equipment. For example, the principles described herein may be incorporated into elliptical exercise machines, paddle boats, unicycles, tricycles, stepper machines, other types of foot operated devices, or combinations thereof.

What is claimed is:

1. An exercise device, comprising:
   a crank assembly, the crank assembly comprising:
      a pedal; and
      a pedal arm connected to the pedal;
   a flywheel connected to the pedal arm; and
   a control mechanism comprising:
      a friction brake assembly, the friction brake assembly comprising:
         a push rod; and
         a friction pad connected to the push rod;
         the friction pad being proximate to the flywheel so that upon activation of the push rod, the friction pad engages the flywheel;
      a magnetic resistance assembly, the magnetic resistance assembly comprising:
         a rotatable sleeve with a sleeve threaded portion;
         a movable housing in mechanical communication with the rotatable sleeve, wherein the rotatable sleeve is rotatable relative to the push rod and the movable housing; and
         at least one magnet disposed within the movable housing;
         the movable housing being proximate the flywheel; and
      a knob in mechanical communication with both the push rod and the rotatable sleeve; and a threaded mover intermeshed with the sleeve threaded portion, wherein the threaded mover is in contact with the movable housing.

2. The exercise device of claim 1, further comprising a return spring in communication with the push rod.

3. The exercise device of claim 1, wherein the push rod is mechanically isolated from the knob.

4. The exercise device of claim 1, wherein the rotatable sleeve comprises at least one spline that interlocks with an inside surface of the knob and allows for axial movement of the knob with respect to the rotatable sleeve.

5. The exercise device of claim 1, wherein the rotatable sleeve is rotationally interlocked with the knob so that the rotatable sleeve rotates when the knob rotates.

6. The exercise device of claim 5, wherein the rotatable sleeve causes the movable housing to move in axial direction when the knob is rotated in a first direction.

7. A exercise device, comprising:
   a crank assembly, the crank assembly comprising:
      a pedal; and
      a pedal arm connected to the pedal;
   a flywheel connected to the pedal arm; and
   a control mechanism comprising:
      a friction brake assembly, the friction brake assembly comprising:
         a push rod including a push rod first end and a push rod second end; and
         a friction pad connected to the push rod at the push rod second end;
         the friction pad being proximate to the flywheel so that upon activation of the push rod, the friction pad engages the flywheel;
      a knob, the knob being movable coaxially with the push rod, wherein in a first knob position, the knob is spaced a distance apart from the push rod and in a second knob position, the knob contacts the push rod at the push rod first end;
      a magnetic resistance assembly, the magnetic resistance assembly comprising:

a rotatable sleeve including a sleeve threaded portion, sleeve threaded portion being in communication with a sensor, the rotatable sleeve including a bore defined by a sleeve inner surface of the sleeve, wherein the push rod is inserted into the bore along a bore length of the bore;

a threaded mover threadedly connected to an end of the rotatable sleeve at the sleeve threaded portion, wherein when the push rod moves axially, a location of the threaded mover is not moved;

a movable housing in contact with the threaded mover, the movable housing being proximate to the flywheel;

the rotatable sleeve comprises at least one spline that rotationally interlocks with an inside surface of the knob so that the rotatable sleeve rotates when the knob rotates, and wherein the spline allows for axial movement of the knob with respect to the rotatable sleeve;

wherein rotating the rotatable sleeve moves the threaded mover in an axial direction such that when the knob is rotated in a first direction, the threaded mover moves the movable housing toward the flywheel, and when the knob is rotated in a second direction, the threaded mover moves the movable housing away from the flywheel, wherein rotating the knob does not affect the push rod, and wherein pushing on the knob moves push rod and the friction pad in the axial direction without affecting a position of the movable housing;

at least one magnet disposed within the movable housing;

wherein the knob is in mechanical communication with both the push rod and the rotatable sleeve;

wherein the knob is rotationally isolated from the push rod;

a knob return spring positioned within a knob cavity in an underside of the knob, the return spring connected to an annular face on the rotatable sleeve and configured to push the knob into the first knob position in the absence of a downward force; and a housing spring configured to return the movable housing to an upward position when the threaded mover is not exerting an axial force on the movable housing.

* * * * *